United States Patent

[11] 3,621,959

| [72] | Inventors | Ronald John Gale<br>Hornchurch;<br>Ronald Frederick Hale, Billericay, both of England |
|---|---|---|
| [21] | Appl. No. | 882,950 |
| [22] | Filed | Dec. 8, 1969 |
| [45] | Patented | Nov. 23, 1971 |
| [73] | Assignee | Ford Motor Company<br>Dearborn, Mich. |
| [32] | Priority | Dec. 20, 1968 |
| [33] | | Great Britain |
| [31] | | 60,836/68 |

[54] SELF-ADJUSTING CLUTCH RELEASE MECHANISM
9 Claims, 2 Drawing Figs.

[52] U.S. Cl. .................................................. 192/111 A
[51] Int. Cl. ................................................... F16d 13/75
[50] Field of Search .......................................... 74/512,
522, 525; 188/196 R, 196 B; 192/111 A

[56] References Cited
UNITED STATES PATENTS
| 1,980,771 | 11/1934 | Tibbetts | 188/196 R |
| 2,036,004 | 3/1936 | Wemp | 192/111 A |
| 2,616,540 | 11/1952 | Miller | 192/111 A |
| 3,109,320 | 11/1963 | Krautwurst | 74/522 X |
| 3,307,667 | 2/1967 | Maurice | 192/111 A X |
| 3,365,042 | 1/1968 | Smirl | 192/995 X |

FOREIGN PATENTS
| 261,770 | 12/1928 | Italy | 192/13 |

Primary Examiner—Milton Kaufman
Attorneys—John R. Faulkner and Clifford L. Sadler ABSTRACT: A self-adjusting clutch release mechanism comprising a clutch pedal normally held against a stop by a return spring. A pawl is pivotally connected to the pedal and engages a ratchet member that is linked to the release lever of a clutch. Displacement of the ratchet member by the pawl when the pedal is moved disengages the clutch. The pawl disengages from the ratchet member when the pedal is held against the stop. A spring connected to the ratchet member takes up any slack in the connection between the ratchet member and the clutch when the pawl is disengaged.

PATENTED NOV 23 1971

3,621,959

INVENTORS
RONALD J. GALE
RONALD F. HALE
BY John R. Faulkner
Clifford L. Sadler
ATTORNEYS

SELF-ADJUSTING CLUTCH RELEASE MECHANISM

BACKGROUND OF THE INVENTION

This invention relates to a self-adjusting clutch release mechanism suitable for motor vehicles.

The usual form of clutch in a motor vehicle includes a clutch release bearing which is axially movable by a clutch release mechanism to release the clutch. The clutch release bearing acts directly on inwardly extending fingers of a Belleville spring in a diaphragm spring clutch or on clutch-disengaging levers in a coil spring clutch. The present invention relates to the kind of clutch release mechanism which maintains a light pressure on the clutch release bearing so that the rotatable portion of the clutch release bearing rotates with the diaphragm spring or clutch-disengaging levers of the clutch when the clutch is engaged.

In a well-known form of clutch release mechanism, a clutch pedal is directly connected by a cable, rod or link to the clutch release lever which is arranged to displace the clutch release bearing. As the friction surfaces of the clutch wear the return movement of the mechanism gradually increases and the clutch pedal gradually rises toward the driver of the vehicle in which the clutch is installed. An adjusting screw is usually provided to decrease the effective length of the mechanism and thereby compensate for wear. An example of this kind of clutch release mechanism is described in British Pat. No. 1,081,798.

BRIEF SUMMARY OF THE DISCLOSURE

According to the disclosure a clutch release mechanism has the following features:

a. a clutch pedal is normally held against a stop by a return spring;

b. a pawl is connected to the pedal;

c. when the pedal is depressed the pawl engages a ratchet member;

d. displacement of the ratchet member by the pawl disengages the clutch;

e. the pawl is disengaged from the ratchet member when the pedal is held against the stop;

f. a spring connected to the ratchet member takes up any slack in the connection between the ratchet member and the clutch.

BRIEF DESCRIPTION OF THE DRAWINGS

The invention will now be described with reference to the accompanying drawings, in which.

DETAILED DESCRIPTION OF THE PREFERRED EMBODIMENT

Figure 1:
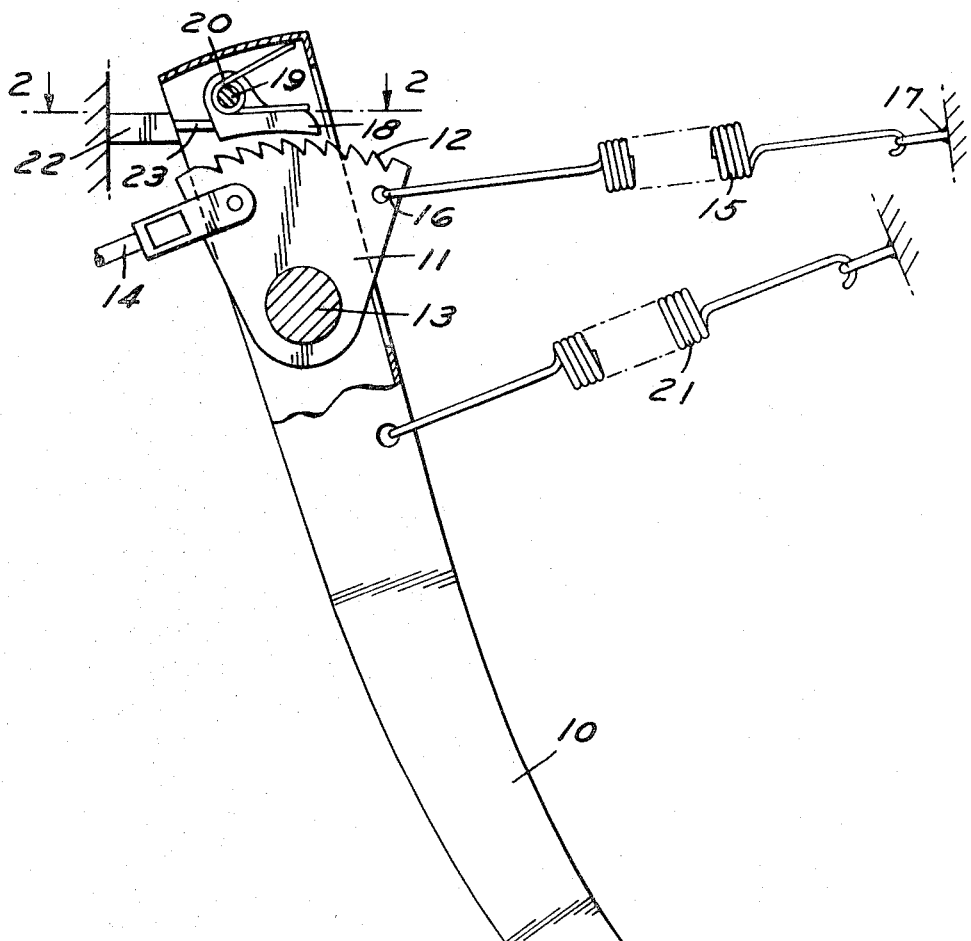
FIG. 1 is a schematic side elevation of a clutch release mechanism embodying the invention.
Figure 2:
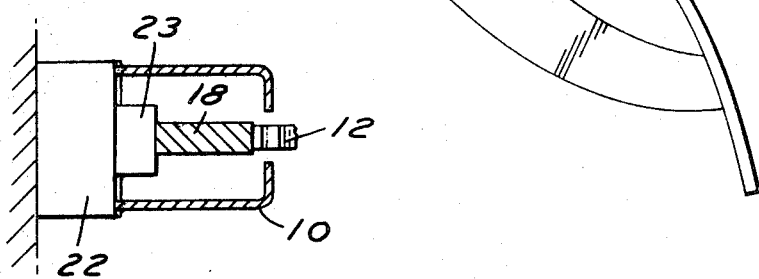
FIG. 2 is a sectional view taken along section line 2—2 of FIG. 1.

A clutch pedal 10 and a sector 11 with ratchet teeth 12 are pivotally mounted on a common shaft 13 fixed to a motor vehicle. One end of a cable 14 is connected to the sector 11. The other end of the cable 14 is connected to a clutch release lever (not shown) of a clutch mechanism. The clutch release lever bears against a clutch release bearing which is mounted for axial sliding movement relative to the clutch mechanism in a conventional fashion.

A coil spring 15 is connected at one of its ends 16 to the sector 11 and at the other of its ends 17 to the vehicle. The coil spring 15 takes up any slack in the cable 14 and ensures that the clutch release lever bears lightly against the clutch release bearing and that the clutch release bearing bears lightly against the diaphragm spring or clutch release members of the clutch when the clutch is engaged.

A pawl 18 is pivotally mounted on a pivot pin 19 fixed to the upper end of the pedal 10. A spring 20 urges the pawl into engagement with the ratchet teeth 12 of the sector 11. A pedal return spring 21 returns the pedal 10 to its rest position against a stop 22 fixed to the vehicle. The stop 22 has an extension 23 which lifts the pawl 18 from the ratchet teeth 12 when the pedal is in its rest position.

OPERATION

When the pedal 10 is depressed for the purpose of releasing the clutch, initial movement disengages the pawl 18 from the extension 23 so that the pawl 18 engages one of the ratchet teeth 12. The sector 11 then moves with the pedal 10 and release of the clutch is then controlled in the conventional manner. During return movement of the pedal, the sector 11 again moves with the pedal 10 until the pawl 18 engages the extension 23 and the pedal engages stop 22. The pawl 18 will thereupon disengage from the sector 11.

If the clutch mechanism is correctly adjusted there will be no further movement of the sector 11 after the pawl 18 is disengaged. In fact, the spring 15 may prevent further movement of the sector 11 just before the pedal 10 reaches its stop. If wear has taken place in the clutch the sector 11 will be displaced relative to the pedal 10 (as the pedal pivots counterclockwise into engagement with the stop 22) until balance is restored between the forces applied by the clutch spring and the spring 15. The next time that the clutch pedal is depressed, the pawl 18 will engage in a different ratchet tooth.

It will be appreciated that the rest position of the clutch pedal 10 is maintained constant irrespective of wear in the clutch or any gradual extension of the cable 14 with use and that the free movement of the clutch pedal before release of the clutch begins is limited to a distance corresponding to a single tooth of the ratchet 12.

In the clutch release mechanism described above it is not necessary to provide any form of screw adjustment in the connections between the clutch and the sector 11. For this reason it is possible to manufacture the mechanism described above with very little increased cost compared to the manually adjusted clutch release mechanism described in British Pat. No. 1,081,798.

The clutch release mechanism described above is particularly suitable for use with a diaphragm spring clutch.

We claim:

1. A self-adjusting actuating mechanism comprising a pivotally mounted lever, stop means constructed to engage said lever when it is in a first position, spring means constructed to urge said lever to said first position, ratchet means constructed to be connected to an actuatable mechanical device, pawl means pivotally connected to said lever, said ratchet means being movably supported relative to said pawl, means urging said pawl means into engagement with said ratchet means, stop means engaging said pawl when said lever is in said first position causing said pawl to be disengaged from said ratchet, said pawl means engaging said ratchet means when said lever is in a second position and constructed to transmit motion from said lever to said ratchet means.

2. A self-adjusting actuating mechanism comprising a pivotally mounted lever, stop means constructed to engage said lever when it is in a first position, ratchet means constructed to be connected to an actuatable mechanical device, spring means constructed to urge said ratchet means to an actuated position, pawl means pivotally connected to said lever, said ratchet means being movably supported relative to to said pawl, means urging said pawl means into engagement with said ratchet means, stop means engaging said pawl when said lever is in said first position causing said pawl to be disengaged from said ratchet, said pawl means engaging said ratchet means when said lever is in a second position and constructed to transmit motion from said lever to said ratchet means.

3. A self-adjusting actuating mechanism comprising a pivotally mounted lever, stop means constructed to engage said lever when it is in a first position, first spring means constructed to urge said lever to said first position, ratchet means constructed to be connected to an actuatable mechanical device, second spring means constructed to urge said ratchet means to an actuated position, pawl means pivotally connected to said lever, said ratchet means being movably supported relative to said pawl, means urging said pawl means into engagement with said ratchet means, stop means engaging said pawl when said lever is in said first position causing said pawl to be disengaged from said ratchet, said pawl means engaging said ratchet means when said lever is in a second position and constructed to transmit motion from said lever to said ratchet means.

4. A self-adjusting actuating mechanism according to claim 1 and including:

said ratchet means comprising a member supported to pivot about an axis coincident with the pivot axis of said lever, said member having ratchet teeth engageable by said pawl.

5. A self-adjusting clutch release mechanism comprising a pivotally mounted pedal, spring means constructed to urge said pedal to a first position, stop means constructed to engage said pedal when it is in said first position, ratchet means constructed to be connected to the clutch release lever of a clutch assembly, spring means urging said ratchet means to a clutch release position, pawl means pivotally connected to said pedal, spring means urging said pawl means into engagement with said ratchet means, stop means engaging said pawl means when said pedal is in said first position causing pawl means to be disengaged from said ratchet means, said pawl means engaging said ratchet means when said pedal is in a second position and constructed to transmit motion from said pedal to said ratchet means 6. A self-adjusting clutch release mechanism according to claim 5 and including:

said ratchet means comprising a member supported to pivot about an axis coincident with the pivot axis of said pedal, said member having ratchet teeth engageable by said pawl.

7. A self-adjusting clutch release mechanism according to claim 6 and including:

said member being pivotally supported on said pedal.

8. A self-adjusting actuating mechanism according to claim 2 and including:

said ratchet means comprising a member supported to pivot about an axis coincident with the pivot axis of said lever, said member having ratchet teeth engageable by said pawl.

9. A self-adjusting actuating mechanism according to claim 3 and including:

said ratchet means comprising a member supported to pivot about an axis coincident with the pivot axis of said lever, said member having ratchet teeth engageable by said pawl.

* * * * *